United States Patent Office 3,278,542
Patented Oct. 11, 1966

3,278,542
Δ³-PIPERIDEINOALKYL GUANIDINE
DERIVATIVES
Hartmund Wollweber and Rudolf Hiltmann, Wuppertal-Elberfeld, Hugo Wilms, Leverkusen, Hans-Gunther Kroneberg, Haan, Rhineland, and Kurt Stoepel, Wuppertal-Vohwinkel, Germany, assignors to Farbenfabriken Bayer Aktiengesellschaft, Leverkusen, Germany, a German corporation
No Drawing. Filed Mar. 27, 1963, Ser. No. 268,462
Claims priority, application Germany, Apr. 7, 1962, F 36,495
17 Claims. (Cl. 260—296)

This invention relates, in general, to organic chemistry and, more particularly, involves the provision of unique Δ³-piperideinoalkyl guanidine derivatives characterized by long-lasting blood-pressure depressant activity and reduced toxicity as compared, for example, to the corresponding saturated guanidinoalkyl substituted piperidine derivatives known heretofore.

Derivatives of Δ³-piperideine, i.e., 3,4-dehydropiperidine, have not been employed heretofore in possible pharmaceutical applications since they have not been readily available. The present invention is based, in part, on our discovery that useful long-lasting blood-pressure depressant activity is exhibited by compounds of the following general formula:

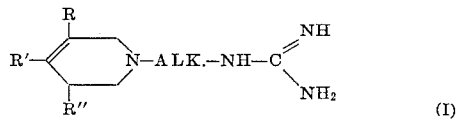
(I)

wherein "Alk. denotes an alkylene linkage of from 2–5 carbon atoms chainlength, R, R' and R" represent hydrogen or an alkyl group of from 1–4 carbon atoms, and wherein either said R or R' substituents must always represent at least one of said alkyl groups.

The compounds of the invention are found to be many times superior to the corresponding saturated guanidinoalkyl substituted piperidine derivatives with respect to the duration and intensity of their blood-pressure depressant activity. Additionally, the toxicity of the Δ³-piperideinoalkyl-guanidines is appreciably lower than that of the piperidinoalkyl-guanidines. These factors were established during pharmacological and toxicological investigations comparing N-(2-guanidinoethyl)-4-methyl-Δ³-piperideine monosulfate and N-(2-guanidinoethyl)-3,4-dimethyl-Δ³-piperideine monosulfate with N-(2-guanidinoethyl)-3,4-dimethylpiperidine monosulfate and N-(2-guanidino-2,2,6,6-tetramethyl)-piperidine monosulfate.

The production of the unique Δ³-piperideinoalkyl-guanidine derivatives represented by Formula I can be effected via a number of alternate syntheses. Thus—

(a) Amines of the general formula

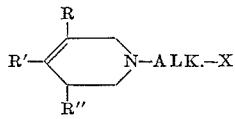

wherein each of Alk., R, R' and R" has the same meaning as assigned above and X denotes a reactive group, are reacted in known manner with a reactive compound capable of forming with X the desired guanidino group, or (b) Δ³-piperideines of the general formula

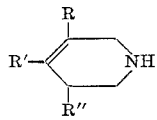

wherein each of R, R' and R" again has the same meaning as assigned above, are reacted with reactive derivatives of guanidino-alcohols of the general formulation

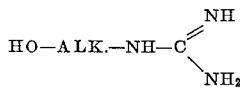

wherein Alk. has the above-stated meaning, or (c) Guanidine derivatives of the general formula

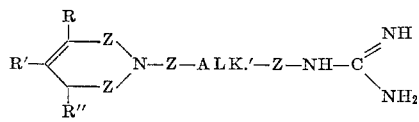

wherein Alk.' denotes a direct bond or an alkylene group with 1–3 carbon atoms and Z is a $CH_2$—, CO—, or CS-group, and wherein at least one CO— or CS-group must be present in the molecule, are treated with complex metal hydrides, and the resulting bases are then optionally converted to their salts with inorganic or organic acids which are pharmacologically inert.

Reactive derivatives of the above-defined guanidino-alcohols which are suitable for this synthesis include, for example, their halides, and sulphuric acid, alkyl-, or aryl-sulphonic acid esters. A particularly advantageous method for effecting the first type of synthesis involves the reaction of a Δ³-piperideino-alkylamine of the general formula

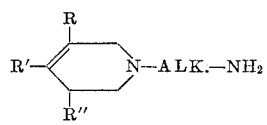

with cyanamide, with a halogenocyanamide and subsequently with ammonia, with alkylisothiourea salts, with isourea ethers, or with guanidine, its salts, or reactive derivatives such, for example, as 1-guanidino-3,5-dimethylpyrazole nitrate.

With inorganic or organic acids, the strong bases of the invention form stable unibasic or dibasic salts which crystallize well.

It is believed that the invention may be best understood by reference to the following specific examples illustrating the application of the foregoing principles and procedures to the preparation of typical compounds of the invention:

*Example I*

N-(2-aminoethyl)-4-methyl-Δ³-piperideine, in amount of 7.1 grams, and 6.8 grams of S-methylisothiourea sulphate in 50 milliliters of alcohol and 10 milliliters of water were heated under reflux for 3 hours. When the reaction was complete, the mixture was concentrated in vacuo, the product was filtered off, and the N-(2-guanidinoethyl)-4-methyl-Δ³-piperideine monosulfate was recrystallized from alcohol/ethyl acetate (M.P. 185–186° C.—turns brown) in a yield of 9 grams. By the addition of one equivalent of sulphuric acid to this salt in alcohol and water the neutral sulphate was obtained (M.P. 232.5° C.—dec.). In contrast to the monosulphate, it is practically unlimitedly stable in air.

The N-(2-aminoethyl)-4-methyl-Δ³-piperideine of boiling point 84–86° C./12 mm. Hg employed as the starting material was obtained by conversion of 4-methyl-Δ³-piperideine with glycol nitrile to form N-cyanomethyl-4-methyl-Δ³-piperideine of boiling point 96° C./12 mm. Hg and subsequent reduction of this compound with lithium aluminum hydride.

Example II

Equivalent amounts of monosodium cyanamide and N-(2-aminoethyl)-4-methyl-$\Delta^3$-piperideine monosulphate were heated in water under reflux for 8 hours. The reaction mixture was treated with one equivalent of sulphuric acid, evaporated in vacuo, the product was filtered-off after the addition of alcohol, and the N-(2-guanidinoethyl)-4-methyl-$\Delta^3$-piperideine monosulphate was recrystallized from alcohol/ethyl acetate.

Example III

N-(2-aminoethyl)-4-methyl-$\Delta^3$-piperideine, in amount of 20 grams, was heated at 120–140° C. with 15 grams of guanidine thiocyanate for 3 hours. When the reaction had been completed, the mixture was taken up in methanol and a little water, passed over a strongly basic ion-exchanger, and the free base thus obtained was converted to the N-(2-guanidinoethyl)-4-methyl-$\Delta^3$-piperideine monosulfate with dilute sulphruic acid.

Example IV

A solution of 15.7 grams of guanidino-ethyl chloride hydrochloride in 200 milliliters of alcohol was gradually added dropwise to a solution of 29 grams of 4-methyl-$\Delta^3$-piperideine in 200 milliliters of alcohol. The reaction mixture was stirred at 20° C. for 2 hours and heated on a water bath for 4 hours. It was then treated with alcoholic hydrochloric acid until its reaction was weakly acidic, concentrated in vacuo, treated with 100 milliliters of ethyl acetate, and the precipitated dihydrochloride was filtered off. When recrystallized from alcohol/ethyl acetate, the N-(2-guanidinoethyl)-4-methyl-$\Delta^3$-piperideine dihydrochloride exhibits a melting point of 195–196° C.

Example V

A solution of 31.6 grams of N-(2-chloroethyl)-4-methyl-$\Delta^3$-piperideine in 100 milliliters of toluene was gradually added dropwise to a solution of 11.8 grams of guanidine in 150 milliliters of alcohol at the reflux temperature. The mixture was heated under reflux for 1 hour, subsequently concentrated in vacuo, alcoholic hydrochloric acid was added until the reaction was weakly acidic, and the separated N-(2-guanidinoethyl)-4-methyl-$\Delta^3$-piperideine dihydrochloride was filtered-off after the addition of ethyl acetate.

The N-(2-chloroethyl)-4-methyl-$\Delta^3$-piperideine of boiling point 60–65° C./0.33 mm. Hg employed as the starting material was obtained by the reaction of 4-methyl-$\Delta^3$-piperideine with ethylene oxide to provide N-(2-hydroxyethyl)-4-methyl-$\Delta^3$-piperideine of boiling point 90–95° C./12 mm. Hg, and subsequent chlorination of this compound with thionyl chloride.

Example VI 4-methyl-$\Delta^3$-piperideine, in amount of 29.1 grams, was heated under reflux for 2 hours with 40 grams of chloroacetyl-guanidine in 300 milliliters of ether. A suspension of 18 grams of lithium aluminum hydride was thereafter added gradually. The mixture was heated under reflux for 12 hours, decomposed with 35 milliliters of 20 percent sodium hydroxide solution, the residue was filtered-off and extracted by boiling twice with 100 milliliter portions of benzene. When the benzene extracts and the ether filtrate had been combined, they were treated with one equivalent of sulphuric acid, and N-(2-guanidinoethyl)-4-methyl-$\Delta^3$-piperideine monosulphate was thus obtained.

Example VII 3,4-dimethyl-$\Delta^3$-piperideine, in amount of 20 grams, was heated under reflux for 4 hours with 18 grams of S-methyl-isothiourea sulphate in 100 milliliters of alcohol and 10 milliliters of water. The reaction product was concentrated in vacuo, and the resulting N-(2-guanidinoethyl)-3,4-dimethyl-$\Delta^3$-piperideine monosulphate was recrystallized from alcohol/ethyl acetate. (Melting point 260° C. decomp., starts to turn brown at 210° C.)

Example VIII

According to the method of Example I, N-(2-guanidinoethyl)-4-ethyl-$\Delta^3$-piperideine was obtained as a basic sulphate of M.P. 177–179° C., and as neutral sulphate of M.P. 212°, from N-(2-aminoethyl)-H-ethyl-$\Delta^3$-piperideine and S-methyl-isothiourea sulphate.

The N-(2-aminoethyl)-4-ethyl-$\Delta^3$-piperideine of B.P. 102–104° C./10 mm. Hg, employed as the starting material, was obtained by partial reduction of N-(2-hydroxyethyl)-4-ethylpyridiniumchloride with sodium borhydride to N-(2-hydroxyethyl)-4-ethyl-$\Delta^3$-piperideine of B.P. 118–124° C./12 mm. Hg, chlorination with $SOCl_2$ to N-(2-chloroethyl)-4-ethyl-$\Delta^3$-piperideine of B.P. 120° C./20 mm. Hg and reaction with liquid ammonia.

According to the method of Example I, from N-(2-aminoethyl)-3-methyl-$\Delta^3$-piperideine and S-methyl-isothiourea sulphate, N-(2-guanidinoethyl)-3-methyl-$\Delta^3$-piperideine was obtained as a basic sulphate of M.P. 208° C. The N-(2-aminoethyl)-3-methyl-$\Delta^3$-piperideine of B.P. 90° C./15 mm. Hg, employed as the starting material, was obtained by partial reduction of N-(2-hydroxyethyl)-3-methylpyridiniumchloride with sodium borhydride to N-(2-hydroxyethyl)-3-methyl-$\Delta^3$-piperideine of B.P. 109–111° C./14 mm. Hg, chlorination with $SOCl_2$ to N-(2-chloroethyl)-3-methyl-$\Delta^3$-piperideine of B.P. 78° C./6 mm. Hg and reaction with liquid ammonia.

Further according to the method of Example I, from N-(2-aminoethyl)-3,5-dimethyl-$\Delta^3$-piperideine and S-methylisothiourea sulphate, N-(2-guanidinoethyl)-3,5-dimethyl-$\Delta^3$-piperideine was obtained as a basic sulphate of M.P. 221–224° C. (dec.).

The N-(2-aminoethyl)-3,5-dimethyl-$\Delta^3$-piperideine of B.P. 96° C./12 mm. Hg employed as the starting material was obtained by partial reduction of N-(2-hydroxyethyl)-3,5-dimethylpyridinium chloride with sodium borhydride to N-(2-hydroxyethyl)-3,5-dimethyl-$\Delta^3$-piperideine of B.P. 117–120° C./13 mm. Hg, chlorination with $SOCl_2$ to N-(2-chloroethyl)-3,5-dimethyl-$\Delta^3$-piperideine of B.P. 67° C./0.6 mm. Hg and reaction with liquid ammonia.

By the same method, N-(2-guanidinoethyl)-4-propyl-$\Delta^3$-piperideine monosulphate and N-(2-guanidinoethyl)-4-isobutyl-$\Delta^3$-piperideine monosulphate were also produced.

What is claimed is:

1. A $\Delta^3$-piperideinoalkyl guanidine derivative selected from the group represented by the formula:

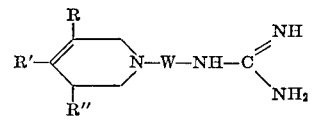

wherein W is alkylene of 2–5 carbon atoms, each of R, R' and R" is selected from the group consisting of hydrogen and alkyl of 1–4 carbon atoms, and wherein at least one of said members R and R' is always such an alkyl, and pharmacologically acceptable non-toxic acid salts thereof.

2. The chemical compound, N-(2-guanidinoethyl)-4-methyl-$\Delta^3$-piperideine.

3. The chemical compound, N-(2-guanidinoethyl)-4-methyl-$\Delta^3$-piperideine sulphate.

4. The chemical compound, N-(2-guanidinoethyl)-4-methyl-$\Delta^3$-piperideine monosulphate.

5. The chemical compound, N-(2-guanidinoethyl)-4-methyl-$\Delta^3$-piperideine dihydrochloride.

6. The chemical compound, N-(2-guanidinoethyl)-3,4-dimethyl-$\Delta^3$-piperideine.

7. The chemical compound, N-(2-guanidinoethyl)-3,4-dimethyl-$\Delta^3$-piperideine monosulphate.

8. The chemical compound, N-(2-guanidinoethyl)-4-ethyl-$\Delta^3$-piperideine.

9. The chemical compound, N-(2-guanidinoethyl)-4-ethyl-$\Delta^3$-piperideine monosulphate.

10. The chemical compound, N-(2-guanidinoethyl)-3-methyl-$\Delta^3$-piperideine.

11. The chemical compound, N-(2-guanidinoethyl)-3-methyl-Δ³-piperideine monosulphate.

12. The chemical compound, N-(2-guanidinoethyl)-3,5-dimethyl-Δ³-piperideine.

13. The chemical compound, N-(2-guanidinoethyl)-3,5-dimethyl-Δ³-piperideine monosulphate.

14. The chemical compound, N-(2-guanidinoethyl)-4-propyl-Δ³-piperideine.

15. The chemical compound, N-(2-guanidinoethyl)-4-propyl-Δ³-piperideine monosulphate.

16. The chemical compound, N-(2-guanidinoethyl)-4-isobutyl-Δ³-piperideine.

17. The chemical compound, N-(2-guanidinoethyl)-4-isobutyl-Δ³-piperideine monosulphate.

References Cited by the Examiner

UNITED STATES PATENTS

| 2,928,829 | 3/1960 | Mull | 260—293 |
| 3,006,913 | 10/1961 | Mull | 260—293 |

OTHER REFERENCES

Elderfield: "Heterocyclic Compounds," vol. 1, p. 617 (Wiley) (1950).

Sidywick: "Organic Chemistry of Nitrogen," 1937 ed., 537–8 (Oxford).

WALTER A. MODANCE, *Primary Examiner.*

NICHOLAS S. RIZZO, ROBERT T. BOND,
*Assistant Examiners.*